(12) United States Patent
Keskar et al.

(10) Patent No.: US 11,360,964 B2
(45) Date of Patent: Jun. 14, 2022

(54) COLLABORATIVE GENERATION OF ONTOLOGY ON A BLOCKCHAIN

(71) Applicant: Innoplexus AG, Eschborn (DE)

(72) Inventors: Abhijit Keskar, Pune (IN); Prashant Bhatwadekar, Pune (IN)

(73) Assignee: Innoplexus AG, Eschborn (DE)

( * ) Notice: Subject to any disclaimer, the term of this patent is extended or adjusted under 35 U.S.C. 154(b) by 218 days.

(21) Appl. No.: 16/582,321

(22) Filed: Sep. 25, 2019

(65) Prior Publication Data

US 2020/0097460 A1 Mar. 26, 2020

Related U.S. Application Data

(60) Provisional application No. 62/736,179, filed on Sep. 25, 2018.

(51) Int. Cl.
*G06F 16/23* (2019.01)
*G06F 16/22* (2019.01)
*G06F 16/27* (2019.01)

(52) U.S. Cl.
CPC ...... *G06F 16/2379* (2019.01); *G06F 16/2246* (2019.01); *G06F 16/27* (2019.01)

(58) Field of Classification Search
CPC ... G06F 16/2379; G06F 16/27; G06F 16/2246
See application file for complete search history.

(56) References Cited

U.S. PATENT DOCUMENTS

| | | | |
|---|---|---|---|
| 10,430,390 B1 * | 10/2019 | McCoy | H04W 80/12 |
| 2018/0232413 A1 * | 8/2018 | Eshwar | H04L 9/3239 |
| 2018/0285810 A1 * | 10/2018 | Ramachandran | G06Q 30/04 |
| 2018/0285996 A1 * | 10/2018 | Ma | G06F 16/2428 |
| 2019/0109706 A1 * | 4/2019 | Peterson | G06F 16/1805 |
| 2019/0353685 A1 * | 11/2019 | Almeida Cavoto | G06Q 20/145 |
| 2020/0013025 A1 * | 1/2020 | Verma | H04L 9/3297 |
| 2020/0213190 A1 * | 7/2020 | Soon-Shiong | G06N 5/022 |

* cited by examiner

*Primary Examiner* — Huawen A Peng
(74) *Attorney, Agent, or Firm* — Ziegler IP Law Group, LLC (57) ABSTRACT

The present invention relates to a system and method of secure collaborative generation of an ontological databank on a blockchain. Ontology on a blockchain results in immutable records of contributions from one or more information contributors. Further, an approval system enables the ontology to remain uncorrupted and free of redundant information. Further, a system and method for accessing one or more data records from an ontological databank on a blockchain is provided wherein for each retrieval of data record, a corresponding information contributor is compensated for his contribution to the ontological databank.

12 Claims, 6 Drawing Sheets

| Transaction | Transaction type | Added By | Approval Flag | Status | Data Record |
|---|---|---|---|---|---|
| Txn 0 | Upload | 345_inno | Set | Executed | Neuropathy |
| Txn 1 | Upload | 411_innoag | Pending | Deferred | R4: EGFR-PD3-Lung Cancer |
| Txn 2 | Approval | 645_innag | - | Executed | Regression |
| Txn 3 | Access | 678_innus | - | Executed | Classification |

| Transaction | Information Consumer | Data Retrieved |
|---|---|---|
| Txn 3 | 345_inno | Lung Cancer; Tyep-2 Diabetes |
| Txn 5 | 411_innoag | --- |
| Txn 9 | 645_innag | --- |
| Txn 19 | 678_innus | Neuropathy; R4:EGFR-PD3-Lung Cancer |

600

Fig. 6

# COLLABORATIVE GENERATION OF ONTOLOGY ON A BLOCKCHAIN

CROSS REFERENCE TO RELATED APPLICATIONS

This application claims priority to U.S. Provisional Patent Application No. 62/736,179 filed Sep. 25, 2018, which is hereby incorporated by reference in its entirety.

TECHNICAL FIELD

The present disclosure relates generally to generation of ontology; and more specifically, to collaborative generation of secure ontology. Furthermore, the present disclosure relates to management of collaborative generation of secure ontology using blockchain.

BACKGROUND

With an increasing prevalence and use of data science, amount of data that can be obtained regarding any aspect or item has grown exponentially. Furthermore, it has become general practice in data science to store data in an ontological database. Generally, the ontological database is designed to improve storage of knowledge and distribute the stored knowledge efficiently.

However, several problems have been encountered with evolution and usage of ontological database. Firstly, most of the information used by organizations to generate an ontology is currently crowdsourced. Therefore, due to the lack of proper informatics resources and infrastructure most organizations fail to properly implement and maintain the crowdsourced data. For example, data related to an information contributor contributing information to the ontology is not recorded. In another example, any information added, updated or altered in the ontology is also not recorded. Consequently, the crowdsourced data used in the ontology remains unvalidated. Therefore, any information consumer (such as researchers) using such ontology can encounter unauthentic and inconsistent information as the crowdsourced data is largely influenced by individual research findings that remains incomplete and unvalidated in many situation and people are afraid to enter into such data processing arrangements given the confidential nature of data records that are to be processed. Currently, different organizations are developing individual ontologies. Therefore, information consumer using more than one ontology can find contradicting relationship between two aspects or items mentioned in the ontologies. Secondly, the ontologies of the current state of the art do not include any mechanism for recording the statistics related to financial transactions associated to the ontologies. Precisely, the current state of the art lacks the mechanism wherein every transaction related to the ontology is inevitably recorded, and a recorded transaction is immutable in nature. Further, there is no secure, unbiased and formal manner in which an information contributor can be compensated for a contribution made to an ontology.

Therefore, in light of the foregoing discussion there exists a need to overcome the aforementioned drawbacks associated with the conventional ontologies.

SUMMARY

Embodiments of the present disclosure present technological improvements as solutions to one or more of the above-mentioned technical problems recognized by the inventor(s) in conventional systems.

In an aspect of the present invention, a system and method for secure collaborative generation of an ontological databank is provided.

In another aspect of the present invention, a system and method for maintaining a trace of modifications to the ontological databank is provided.

In another aspect of the present invention, a system and method for tracing the rightful ownership of information in the ontological databank is provided.

In another aspect of the present invention, a system and method for identifying an amount of contribution of each information contributor is provided.

In yet another aspect of the present invention, a system and method for accessing the ontological databank while providing monetary benefit to an information contributor based on amount of contribution is provided.

Beneficially, the present invention provides a method for secure collaborative generation of an ontological databank on a blockchain, the methods comprising:
  receiving an upload transaction from an information contributor wherein the upload transaction comprises information pertaining to the ontological databank;
  deferring an execution of the upload transaction;
  determining an availability of an approval transaction at the end of the ledger cycle;
  executing, responsive to determination of availability of the approval transaction on the blockchain, the upload transaction wherein execution of the upload transaction results in a modification of the ontological databank.

In another aspect, the present invention provides a system for secure collaborative generation of an ontological databank on a blockchain, the blockchain configured to:
  receive an upload transaction from an information contributor wherein the upload transaction comprises information pertaining to the ontological databank;
  defer an execution of the upload transaction;
  determine an availability of an approval transaction at the end of the ledger cycle;
  execute, responsive to determination of availability of the approval transaction on the blockchain, the upload transaction wherein execution of the upload transaction results in a modification of the ontological databank.

In yet another aspect of the present invention, a system for accessing one or more data records from an ontological databank, the system comprising:
  a blockchain configured to store the ontological databank in
  a data structure repository of an initial smart contract of the blockchain, wherein the blockchain is further operable to:
    receive an access transaction wherein the access transaction has preconfigured permissions to invoke one or more smart contract methods within the initial smart contract of the blockchain and wherein the access transaction comprises details;
    execute the access transaction wherein execution of the access transaction comprises:
      invoking a smart contract method to determine a cost associated with the requested one or more data records and subsequent to determination of the cost, initiate a wallet transaction for the determined pricing;
      retrieving, subsequent to successful execution of the wallet transaction, the one or more data records from the ontological databank stored in the data structure repository of the initial smart contract of the blockchain;

return the retrieved one or more data records to the access transaction.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the below-mentioned detailed description and drawings.

OBJECT OF INVENTION

An object of the invention is to facilitate generation of an ontological databank in a collaborative and secure manner.

Another object of the invention is to enable a trace of modification of the ontological databank in order to remove redundancy and fraudulent changes.

An object of the invention is to maintain the rights of original contributors of the ontological databank.

Another object of the invention is to provide a means for formal verification prior to any modification to the ontological databank.

Another object of the invention is to compensation for information contributors based on the amount of contribution thereby incentivising them for greater contribution to the ontological databank.

BRIEF DESCRIPTION OF DRAWINGS

The summary above, as well as the following detailed description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 3A, 3B, and 3C depict a disease ontology, a gene ontology and an intervention ontology respectively.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

It will be appreciated that the drawings illustrated herein are for representative purposes only and do not intend to limit the scope of the present disclosure, and actual implementation of the present disclosure may be viewed substantially differently.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data. Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Additional modules can be included without deviating from the novel art of this disclosure. In addition, each module can include any number and combination of sub-modules, and systems, implemented with any combination of hardware and/or software modules.

Method steps of the invention may be performed by one or more computer processors executing a program tangibly embodied on a computer-readable medium to perform functions of the invention by operating on input and generating output. Suitable processors include, by way of example, both general and special purpose microprocessors. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer executable instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer executable instructions for carrying out a plurality of operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Figure 1:
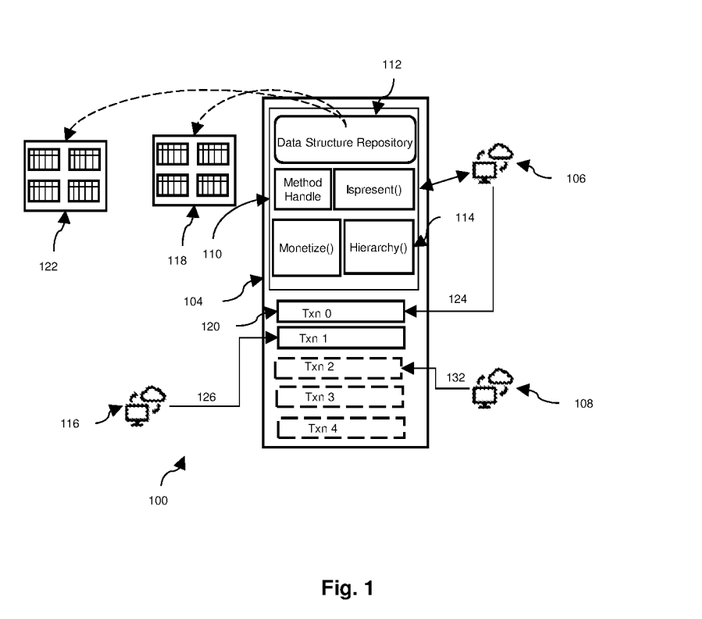
FIG. 1 is an illustration of a block diagram of a system for collaborative generation of ontology on a blockchain as per the present disclosure.

The present invention claims a system and method of secure and collaborative generation of an ontological databank on a blockchain. The present invention discloses a method of developing the ontological databank by means of contributions from information contributors and further discloses a method for retrieving information from the ontological databank while rewarding the information contributors for their part of contribution to the ontological databank. FIG. 1 depicts an exemplary system as per a preferred embodiment of the present invention.

Figure 2:
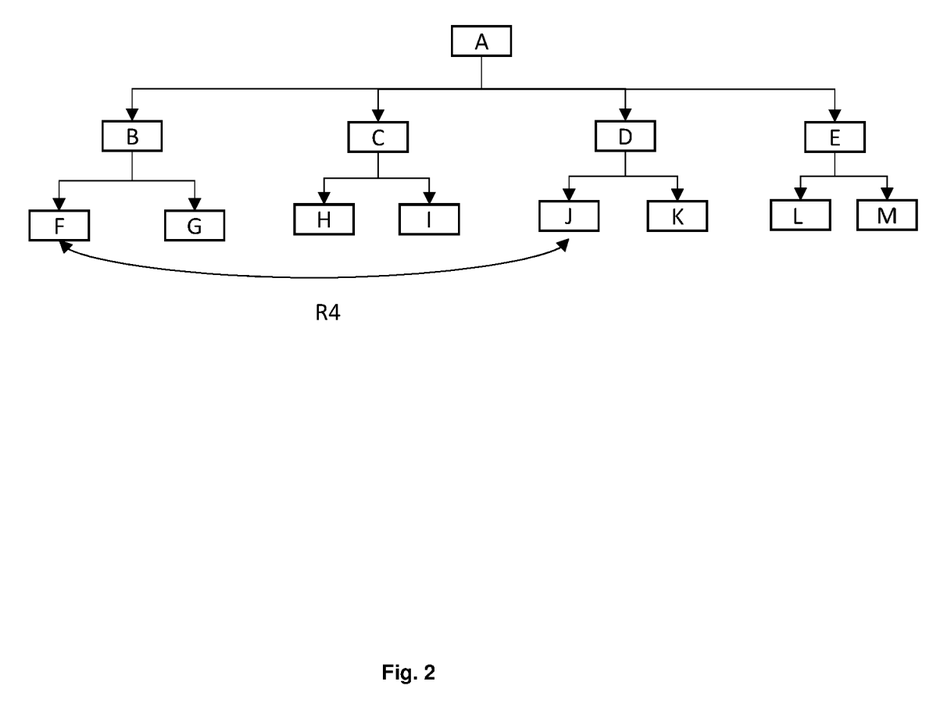
FIG. 2 depicts a hierarchical ontology as used in the context of present disclosure.

Throughout this disclosure, the term "ontological databank" relates to an Ontology which is a set of concepts (namely, information, ideas, data, semantic associations and so forth) in a field (namely, subject area, domain and so forth) that details out types and properties of the set of concepts and semantic association thereof. Furthermore, the ontological databank provides a base to include contextually (namely, conceptually) relevant information pertaining to a field, domain, subject, item, aspect and the like. Moreover, the ontological databank includes information as a structured, optimal and relevant set of concepts. Additionally, the ontological databank may store information on how a certain concept in a certain field may be associated with one or more concepts in multiple fields. Furthermore, the ontological databank may store ontology hierarchically. For example, a module "A" may include plurality of sub modules such as "B", "C", "D", and "E", furthermore, the sub module "B", may include sub modules "F", and "G", the sub module "C", may include sub modules "H", and "I", the sub module "D", may include sub modules "J", and "K", and the sub module "E", may include sub modules "L", and "M". In such instance, the hierarchical ontology would store the concepts "A", "B", "C", "D", "E", "F", "G", "H", "I", "J", "K", "L", and "M" in a hierarchical manner, i.e. the module "A" branches out to "B", "C", "D", and "E", and thereafter "B" branches out to "F", and "G", "C" branches out to "H", and "I", "D" branches out to "3", and "K", and "E" branches out to "L", and "M". FIG. 2 depicts a hierarchical ontology in the ontological databank. Further, the ontological databank consists of a plurality of ontologies related to a field of the ontological databank. Each individual ontology of the plurality of ontologies comprises concepts in form of nodes and leaf. Further, there could be relationships between concepts across multiple ontologies of the ontological databank. As per an example embodiment of the present invention the ontological databank relates to a field of life sciences wherein the ontological databank is comprised of one or more ontologies such as a separate ontology for diseases, an ontology for genes, an ontology for drugs and so on. FIGS. 3A, 3B, and 3C depict a hierarchical ontology for indication, genes and intervention respectively, as per the example embodiment. Alternatively, the hierarchical ontological databank can be generated for a retail industry.

Figure 4:
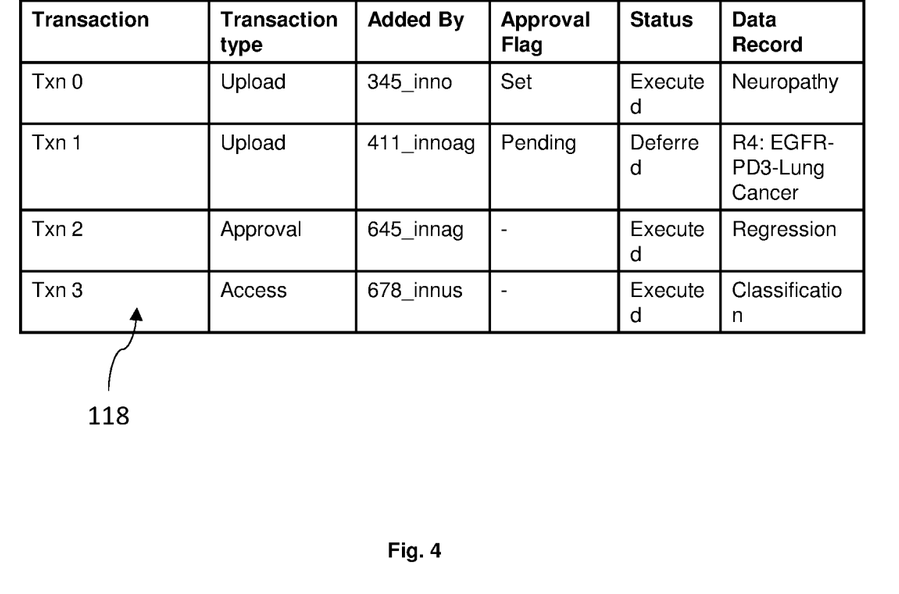
FIG. 4 depicts a status index as described as per the present disclosure.

Referring to FIG. 1, the system 100 comprises a blockchain 102 communicably coupled to one or more information contributors 106 though a data communication network 104. The blockchain can be a public blockchain or a private blockchain. Optionally, the blockchain could be permissionless or permissioned. The blockchain 102 is configured to include an initial smart contract 110 wherein the initial smart contract 110 comprises a data structure repository 112. The data structure repository 112 is operable to store an ontological databank 122. As described in the foregoing paragraphs, the ontological databank may comprise of a plurality of ontologies, each of the plurality of ontologies corresponding to a specific set of concepts. Optionally, the data structure repository 112 is configured to provide separate storage locations for each of the plurality of ontologies. Each of the plurality of ontologies are earmarked with a class identifier. The initial smart contract 110 further comprises a data processing method 114, and one or more standard methods with pre-configured permissions. The data processing method is a smart contract method that, when invoked, implements at least one data processing algorithm to build a sub-hierarchy from information passed as input argument to the data processing method. Further, the initial smart contract 110 comprises a status index 118 of one or more transactions added to the blockchain 102 wherein each of the one or more transactions of the status index are mapped against a transaction owner, an execution status, and an approval flag. FIG. 4 depicts a status index 118 as per the exemplary embodiment. In certain embodiment, the ontological databank is stored in an encrypted form in the data structure repository 112 of the initial smart contract 110 of the blockchain 102. In such cases, a user can view only a root node or alternately a preview of subsequent layers of a sub-hierarchy of an ontological databank thus preventing unauthorised access to the ontological databank.

Throughout this disclosure, the term "initial smart contract" refers to a preconfigured smart contract appended to a blockchain and includes a set of object definitions that are created automatically at the time of deployment of the preconfigured smart contract. The initial smart contract is an essential element for the blockchain communicably coupled to the information contributor and the information consumer. Any blockchain as per the disclosed system must be deployed said initial smart contract. The term "smart contract method" refers to set of codes which are used to interrogate a smart contract or change its state. A smart contract can have more than one smart contract methods within it, based on the desired output. Further, the term "standard method" refers to a default method call, from a smart contract, with pre-configured parameters unalterable by any user of blockchain and implement atleast one defined function. Optionally, the standard methods can be implemented through one or more smart contract wrappers.

A CPU time/RAM or other resources needed to execute the smart contract methods can be acquired prior to addition of the initial smart contract. In some cases, it may be possible to add these resources on the fly. Moreover, the one or more standard methods can be re-configured/fine-tuned later by freezing the block containing the initial smart contract and updating the configurations of the one or more standard methods.

The term "data structure repository" refers to an organized collection of data elements stored inside the smart contract on a blockchain. These data elements can have different types and different lengths. The said data structure repositories can be either linear data structures or hierarchical. As a non-limiting example of such data structure repository, as used in one of the embodiments of the present disclosure, are linked lists and arrays with data elements being stored in the data structure repository in key-value pair format. Furthermore, the term "off-chain data storage medium" refers to any storage of data records which isn't stored on a blockchain. An example of such off-chain storage medium is Enigma, Swarm etc. The blockchain, in such cases, reads the data from third party solutions such as Oracle.

An Information Contributor 106, connected to the blockchain via a first client-device, is an entity that contributes information to the ontological databank. Similarly, an information consumer 108, connected to the blockchain via a second client device, is an entity that retrieves information from the ontological databank. Moreover, an "Approver" 116, connected to the blockchain via a third client device, is an entity which approves and/or rejects information submitted by the information contributor 106. The information contributor, the information consumer, and the Approver accesses the blockchain via a user interface associated with the respective client devices. Further, the information contributor, the information consumer and the Approver have a user account associated with the blockchain wherein the user account is configured to receive payments, preferably in form of cryptocurrency transactions, from the blockchain.

The term "user interface" refers to a graphical user interface unit or a command line interface which enables a user to access information stored on the blockchain and/or to store information on the blockchain. Further, the user interface is configured to receive one or more inputs from a user. The term "user" includes the information contributor, the information consumer and the approver. The term "client device" generally refers to a device executing an application, program, or process in a client/server relationship that requests information or services from another application, program, process or device (namely, a server) on a data communication network. Importantly, the terms "client" and "server" are relative, as an application may be a client to one application but a server to another application. Notably, the first and second client devices are configured to function as a "client" in a client/server relationship with the server arrangement. However, the first and second client devices may be configured to function as a "server" in a client/server relationship with other computing devices. Throughout the present disclosure, the terms "first client device", and "second client device"" refer to devices associated with an information contributor, an information consumer, and a approver respectively that acts as clients to the data processing arrangement in a client/server relationship, wherein such devices can be personal devices or servers in local environments of the information contributor, information consumer, and approver, respectively.

The first client device, the second device, and the third client device are operable, individually, to add a transaction to the blockchain 102 through a user interface. The transaction may be added through a web-based application or mobile based application on a user interface 130 (not shown in FIG. 1) of the first client device and the second client device. In an alternate embodiment, third party extensions on the data processing arrangement allowing addition of the transaction to the blockchain are used.

Figure 5:
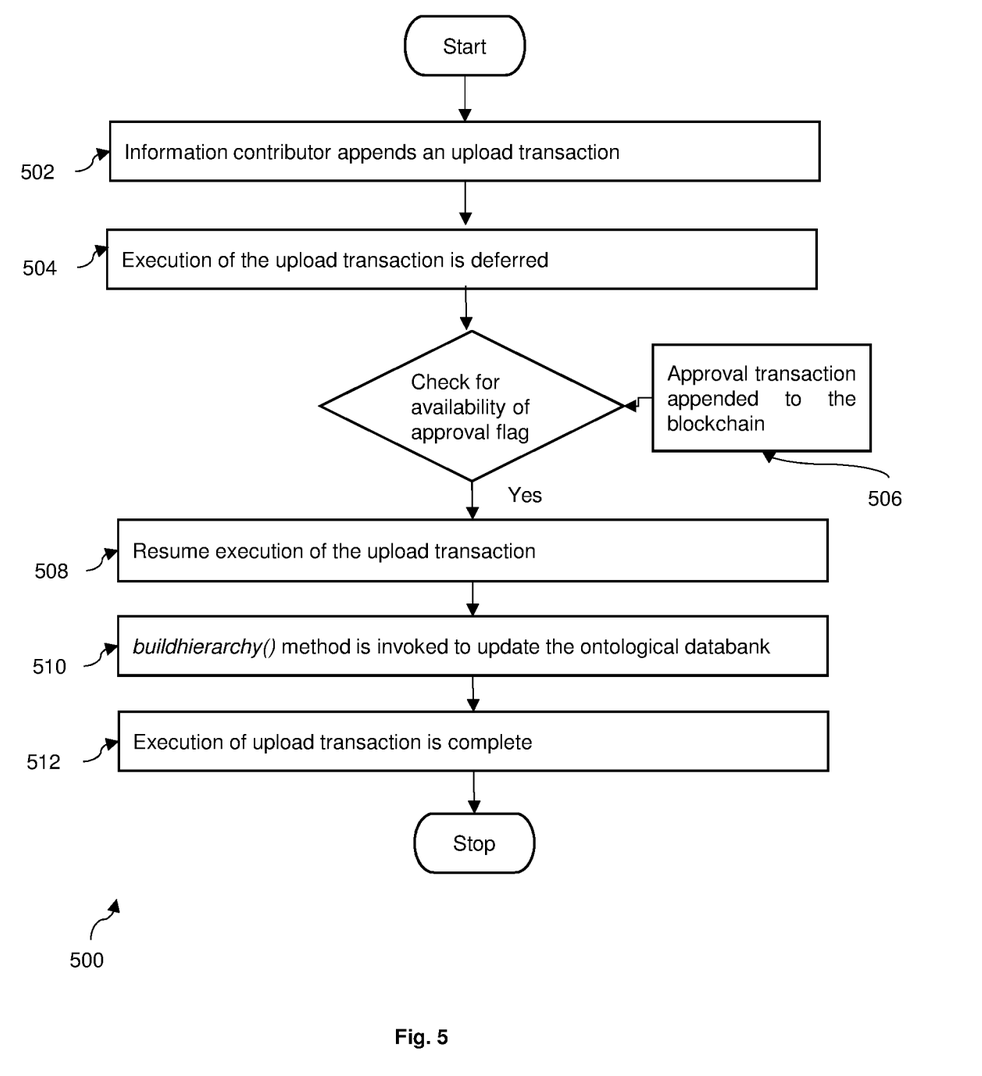
FIG. 5 is a flowchart depicting the method steps for the system in operation as per the present disclosure.

In operation, as per method steps 500 depicted in FIG. 5, at step 502 an information contributor 106 appends, via the first client device, an upload transaction to the blockchain 102 wherein the upload transaction 124 has preconfigured permissions to invoke one or more standard smart contract methods in the initial smart contract 110 on the blockchain 102, and comprises one or more data records wherein the one or more data records include information pertaining to the ontological databank. Information pertaining to the ontological databank includes addition and/or deletion of a sub-hierarchy, or a node or a leaf to a hierarchical ontology in the ontological databank. In such cases, the upload transaction comprises data records in a predefined format. In an embodiment, the one or more data records related to addition and/or deletion of a node, leaf include references to parent node where a sub-hierarchy is to be updated. Optionally, information pertaining to the ontological databank includes a relationship between one or more node and/or leaf between one or more ontology of the ontological databank. In such cases, the data records with a predefined format including from and to reference nodes are provided. As a non-limiting example of such reference is depicted as follows:

R4
Relationship type:
From Ref: F address
To Ref: 3 Address

Hence, a node representing concepts or leaves representing sub-concepts or, relationships between two nodes of an ontology or different ontology are added in form of one or more upload transaction. Further, the upload transaction comprises information pertaining to the information contributor 106. Optionally, details related to pricing of the one the more data records included with the upload transaction is provided by the information contributor 106. Further, an entry corresponding to the upload transaction is created in the status index 118.

Subsequently, at step 504, an execution of the upload transaction is deferred until a next ledger clock cycle and the entry corresponding to the upload transaction in the status index 118 is updated to indicate a deferred execution status. The term "ledger clock" refers to a clock associated with the blockchain, wherein the clock administers the time of execution of the block in the blockchain. A cycle for ledger clock, "ledger clock cycle", is predetermined by an owner of the blockchain. The upload transaction is deferred since the one or more data records in the upload transaction added to the blockchain 102 are to be verified prior to updating the ontological databank. Since, the process of verification might take some time, the ontological databank should not be updated immediately i.e. in real time. Immediate modification of the ontological databank might lead to frivolous and redundant content being added to the ontological databank. The verification of the one or more data records is done by a set of researcher, designated as "Approvers", by means of notifying a verification to the blockchain 102. In an aspect of the present invention, the verification, at step 506, can be in form an approval transaction 126 appended to the blockchain 102 wherein the approval transaction 126 sets the approval flag against the entry, in the status index 118, corresponding to the upload transaction thereby depicting an acceptance for modification of the ontological databank with the one or more data records of the upload transaction. Optionally, the approval transaction 126 comprises details related to pricing of the one or more data records as provided by the information contributor 106.

The execution of the upload transaction is resumed at the next ledger clock cycle of the blockchain 102, at step 508, and the initial smart contract checks for the approval flag against the upload transaction. In case of availability of approval flag, the upload transaction is successfully resumed and a smart contract method buildhierarchy( ) is invoked at step 510. The smart contract method buildhierarchy( ) is operable to update the ontological databank with the one or more data records available in the upload transaction. In an embodiment, the one or more data records can relate to information pertaining to the ontological databank such as a new sub-hierarchy comprising nodes and leaves not previously present in the ontological databank. Optionally, the one or more data records might contain information pertaining to a replacement set of nodes and/or leaves for existing nodes and/or leaves on the ontological databank. In case of the ontological databank comprising of a plurality of ontologies, the upload transaction shall include reference to the class identifier of the ontology where the information is to be updated. Optionally, the one or more data records includes information pertaining to a relationship between one or more nodes of at least two ontologies of the ontological databank. Subsequently, the execution of the upload transaction is completed successfully at step 512.

Alternatively, in case at the end of ledger clock cycle, the approval flag is not available against the entry, in the status index 118, corresponding to the upload transaction, the execution of the upload transaction is deferred further till the next ledger clock cycle.

The system is further designed to cancel one or more upload transactions which remain deferred for a predetermined period of time thereby implying that such upload transactions have not been approved for updating the ontological databank. The predetermined period of time can be a designated number of ledger clock cycles. As an example, said predetermined period of time can be 10 ledger clock cycles which would mean that if the approval flag is not available against an upload transaction within 10 ledger clock cycles, said upload transaction shall be cancelled.

In an embodiment of the present invention, the ontological databank is stored in an encrypted format within the data structure repository 112 of the initial smart contract 110 of the blockchain 102. Whenever, an upload transaction is successfully executed to add one or more data records to the ontological databank, such one or more data records are encrypted prior to addition to the ontological databank.

Figure 6:
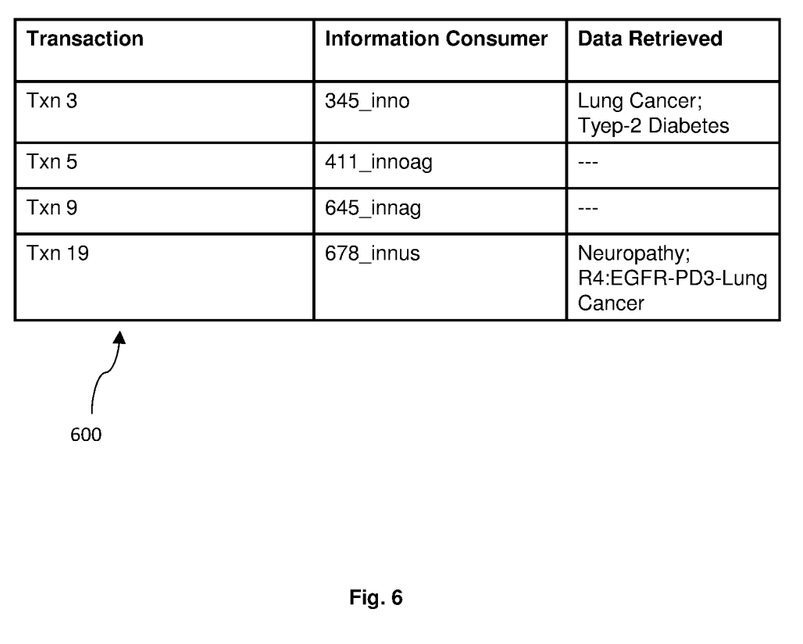
FIG. 6 depicts an access table as per the present disclosure.

In an aspect of the present invention, the present invention provides a system and method for accessing one or more data records from the ontological databank wherein the one or more data records relate to a sub-hierarchy including nodes and/or relationships. As per the said embodiment, an information consumer, via the second client device, can append an access transaction to fetch the one or more data records from the ontological databank on the blockchain 102. The access transaction has preconfigured permissions to invoke a standard smart contract method ispresent( ) within the initial smart contract 110. The standard smart contract method ispresent( ) is operable to determine if the requested one or more data records are already fetched previously by the information consumer. This is achieved by looking-up an access table 128 stored within the data structure repository 112 of the initial smart contract 110. The access table comprises information pertaining to information consumers and access transactions appended by said information consumers and details of data records fetched by said information consumer. Every time a new information consumer appends an access transaction to the blockchain 102, a new entry against said information consumer is added to the index table 128. In case of already existing information consumer appending another access transaction, the entry corresponding to said information consumer is updated in the access table 128. FIG. 6 depicts an access table 128 as per the present disclosure.

Responsive to determination that the one or more data records requested through the access transaction are already fetched previously by the information consumer, the requested one or more data records representing nodes, leaves and relationships from a sub-hierarchy, or as the case may be, are fetched and returned to the access transaction.

Alternatively, responsive to determination that the one or more records requested through the access transaction are not previously fetched by the information consumer, the access transaction is deferred, and a smart contract method monetize( ) is invoked in the initial smart contract 110. The smart contract method monetize( ) estimates a cost of the requested one or more data records. Said estimation is done on the aggregated cost of all the nodes/sub-nodes, leaves and relationships forming part of the requested one or more data records wherein each of the said node, sub-node and/or relationship are tagged with an individual cost. Such cost tagging is done by the information contributor at the time of appending an upload transaction comprising the requested one or more data records. Optionally, a cost tagging of the nodes, sub-nodes and relationships can be done by the Approvers at the time of appending the approval transaction. Alternatively, optionally, any method of pricing of requested one or more data records, including determination of cost on the fly, can be implemented to reach a cost for the requested one or more data records.

Once a cost for the requested one or more data records is determined, a smart contract method for implementing a wallet transaction with the information consumer and the information contributor is initiated within the initial smart contract 110. Responsive to successful execution of the wallet transaction, the access transaction is resumed for execution and the requested one or more data records are returned to the access transaction.

Optionally, in case the ontological databank is encrypted, the one or more requested data records are decrypted prior to returning the one or more data records to the access transaction.

It shall be appreciated by persons skilled in the art that the terms upload transaction, approval transaction and access transaction are used for naming purposes for better clarity and understanding of the disclosed invention and refer to a transaction appended for uploading information pertaining to the ontological databank, for approving modification of the ontological databank with the information included in the upload transaction, and for retrieving one or more data records from the ontological databank. In substance, the upload transaction, approval transaction, and access transactions are ascribed the same meaning as is prevalent in the industry in context of a transaction added to the blockchain.

Further, it shall be appreciated by persons skilled in the art that the standard smart contract method buildhierarchy( ) is just a nomenclature for the said standard smart contract method and is used for the purpose of describing the embodiment. In essence, a method, with any nomenclature, configured to add a new sub-hierarchy to a hierarchical ontology or add/delete a node/leaf shall suffice the purposes of buildhierarchy( ) smart contract method. Similarly, ispresent( ) and monetize( ) are nomenclatures for the smart contract methods and refer to any smart contract method configured to check if one or more data records are fetched previously by a user and configured to determine a cost for one or more data records, respectively.

Any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. At least portions of the functionalities or processes described herein can be implemented in suitable computer-executable instructions.

It will be appreciated that features of the present disclosure are susceptible to being combined in various combinations and additional features may be introduced without departing from the scope of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for secure collaborative generation of an ontological databank on a blockchain, wherein the system comprises:
   the blockchain communicably coupled to a first client device and a third client device through a data communication network; and
   a processor that causes the blockchain to:
      receive an upload transaction from an information contributor via the first client device, wherein the upload transaction comprises information pertaining to the ontological databank;
      defer an execution of the upload transaction;
      determine an availability of an approval transaction at the end of the ledger cycle, wherein the approval transaction is appended to the blockchain based on an approval of the information pertaining to the ontological databank, wherein the approval transaction is appended to the blockchain by an approver via the third client device;
      execute, responsive to determination of availability of the approval transaction on the blockchain, the upload transaction, wherein execution of the upload transaction results in a modification of the ontological databank.

2. The system of claim 1, wherein the ontological databank is stored in a data structure repository of an initial smart contract of the blockchain.

3. The system of claim 1, wherein the ontological databank is stored in a distributed file storage system communicably coupled to the blockchain.

4. The system of claim 1, wherein the ontological databank is hierarchical in nature.

5. The system of claim 1 wherein the information pertaining to the ontological databank includes a concept or a relationship between concepts.

6. The system of claim 1, wherein the modification of the ontological databank includes addition to, or deletion of one or more nodes or one or more relationships in the ontological databank.

7. A method for secure collaborative generation of an ontological databank on a blockchain, the method being implemented via a system, the system comprising the blockchain communicably coupled to a first client device and a third client device through a data communication network and a processor that causes the blockchain to perform the method, the method comprising:
   receiving an upload transaction from an information contributor via the first client device, wherein the upload transaction comprises information pertaining to the ontological databank;
   deferring an execution of the upload transaction;
   determining an availability of an approval transaction at the end of the ledger cycle, wherein the approval transaction is appended to the blockchain based on an approval of the information pertaining to the ontological databank, wherein the approval transaction is appended to the blockchain by an approver via the third client device;
   executing, responsive to determination of availability of the approval transaction on the blockchain, the upload transaction wherein execution of the upload transaction results in a modification of the ontological databank.

8. The method of claim 7, wherein the ontological databank is stored in a data structure repository of an initial smart contract of the blockchain.

9. The method of claim 7, wherein the ontological databank is stored in a distributed file storage system communicably coupled to the blockchain.

10. The method of claim 7, wherein the ontological databank is hierarchical in nature.

11. The method of claim 7, wherein the information pertaining to the ontological databank includes a concept or a relationship between concepts.

12. The method of claim 7, wherein the modification of the ontological databank includes addition to, or deletion of one or more nodes or one or more relationships in the ontological databank.

* * * * *